(12) United States Patent
Li

(10) Patent No.: US 10,871,979 B2
(45) Date of Patent: Dec. 22, 2020

(54) METHODS AND DEVICES FOR ESTABLISHING COMMUNICATION BETWEEN BLOCKCHAIN NETWORKS

(71) Applicant: Advanced New Technologies Co., Ltd., Grand Cayman (KY)

(72) Inventor: Yanpeng Li, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/752,356

(22) Filed: Jan. 24, 2020

(65) Prior Publication Data

US 2020/0334057 A1 Oct. 22, 2020

Related U.S. Application Data

(63) Continuation of application No. PCT/CN2019/083497, filed on Apr. 19, 2019.

(51) Int. Cl.
*H04L 9/32* (2006.01)
*G06F 9/54* (2006.01)
(Continued)

(52) U.S. Cl.
CPC .......... *G06F 9/45529* (2013.01); *G06F 9/546* (2013.01); *G06Q 20/389* (2013.01);
(Continued)

(58) Field of Classification Search
CPC ..... H04L 9/3255; H04L 9/3239; G06F 9/546; G06Q 20/389
See application file for complete search history.

(56) References Cited

U.S. PATENT DOCUMENTS 10,298,395 B1 * 5/2019 Schiatti ................. H04L 9/3218
10,298,585 B1 * 5/2019 Treat .................... H04L 9/0643
(Continued)

FOREIGN PATENT DOCUMENTS

CN 108805701 A 11/2018
CN 108876618 A 11/2018
(Continued)

OTHER PUBLICATIONS

Li, F., et al., "Research on the Progress in Cross-chain Technology of Blockchains", Journal of Software, Mar. 27, 2019, pp. 1649-1660, http://www.jos.org.cn/1000-9825/5741.htm.
(Continued)

*Primary Examiner* — Jason Chiang
(74) *Attorney, Agent, or Firm* — Finnegan, Henderson, Farabow, Garrett & Dunner, L.L.P.

(57) ABSTRACT

Disclosed herein are methods, devices, and apparatuses, including computer programs stored on computer-readable media, for establishing communication between a first blockchain network and a second blockchain network. One of the methods includes: embedding a first library into a process; executing the first library to create a first border node within the process, wherein the first border node operates in the first blockchain network; embedding a second library into the process; executing the second library to create a second border node within the process, wherein the second border node operates in the second blockchain network; and establishing a communication interface within the process to allow the first border node and the second border node to communicate with each other.

16 Claims, 7 Drawing Sheets

(51) Int. Cl.
*G06Q 20/38* (2012.01)
*G06F 9/455* (2018.01)
*H04L 29/08* (2006.01)

(52) U.S. Cl.
CPC .......... *H04L 9/3239* (2013.01); *H04L 9/3255* (2013.01); *H04L 67/104* (2013.01); *H04L 67/141* (2013.01); *H04L 2209/38* (2013.01)

(56) References Cited

U.S. PATENT DOCUMENTS

| | | | |
|---|---|---|---|
| 2017/0132621 A1* | 5/2017 | Miller | G06Q 20/065 |
| 2017/0295157 A1* | 10/2017 | Chavez | G06F 21/44 |
| 2017/0352012 A1* | 12/2017 | Hearn | G06Q 40/12 |
| 2018/0109541 A1* | 4/2018 | Gleichauf | H04L 67/1097 |
| 2018/0113752 A1* | 4/2018 | Derbakova | G06Q 40/025 |
| 2018/0375840 A1* | 12/2018 | Moy | H04L 9/3239 |
| 2019/0058581 A1* | 2/2019 | Wood | H04L 9/3239 |
| 2019/0081793 A1* | 3/2019 | Martino | H04L 9/0894 |
| 2019/0172026 A1* | 6/2019 | Vessenes | H04L 9/3247 |
| 2019/0238327 A1* | 8/2019 | Li | G06F 21/64 |
| 2019/0251199 A1* | 8/2019 | Klianev | G06Q 40/04 |
| 2019/0279206 A1* | 9/2019 | Song | G06F 21/00 |
| 2019/0305950 A1* | 10/2019 | Treat | H04L 63/12 |
| 2019/0317936 A1* | 10/2019 | Keskar | G06F 16/2379 |
| 2019/0318328 A1* | 10/2019 | Castinado | G06Q 20/06 |
| 2019/0340267 A1* | 11/2019 | Vo | G06F 16/2365 |
| 2019/0340269 A1* | 11/2019 | Biernat | G06F 16/248 |
| 2019/0347657 A1* | 11/2019 | Guo | G06Q 20/10 |
| 2020/0007513 A1* | 1/2020 | Gleichauf | H04L 63/0428 |
| 2020/0034395 A1* | 1/2020 | Lu | H04L 9/3239 |
| 2020/0043007 A1* | 2/2020 | Simons | H04L 9/3236 |
| 2020/0074450 A1* | 3/2020 | Fletcher | G06F 21/64 |
| 2020/0076617 A1* | 3/2020 | Borne-Pons | H04L 9/3239 |
| 2020/0099524 A1* | 3/2020 | Schiatti | H04L 9/3221 |

FOREIGN PATENT DOCUMENTS

| | | |
|---|---|---|
| CN | 109587131 A | 4/2019 |
| WO | WO 2019/072271 A2 | 4/2019 |

OTHER PUBLICATIONS

Written Opinion of the International Searching Authority of PCT Application No. PCT/CN2019/083497, dated Jan. 23, 2020, issued by the ISA/CN—National Intellectual Property Administration, PRC, China.

International Search Report of PCT Application No. PCT/CN2019/083497, dated Jan. 23, 2020, issued by the ISA/CN—National Intellectual Property Administration, PRC, China.

* cited by examiner

METHODS AND DEVICES FOR ESTABLISHING COMMUNICATION BETWEEN BLOCKCHAIN NETWORKS

CROSS REFERENCE TO RELATED APPLICATIONS

This application is a continuation of International Application No. PCT/CN2019/083497, filed Apr. 19, 2019, the entire content of which is incorporated herein by reference.

TECHNICAL FIELD

The specification relates generally to computer technologies, and more particularly, to methods and devices for establishing communication between blockchain networks.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

A blockchain system is implemented using a peer-to-peer (P2P) network, in which the nodes communicate directly with each other, e.g., without the need of a fixed, central server. Each node in the P2P network may initiate communication with another node in the P2P network.

Although a node may communicate with other nodes in the same blockchain network, the node may have limited abilities to communicate with nodes in a different blockchain network. As the number of blockchain networks increases, so does the need to provide cross-chain communication between blockchain networks.

SUMMARY

In one embodiment, a computer-implemented method for establishing communication between a first blockchain network and a second blockchain network includes: embedding a first library into a process; executing the first library to create a first border node within the process, wherein the first border node operates in the first blockchain network; embedding a second library into the process; executing the second library to create a second border node within the process, wherein the second border node operates in the second blockchain network; and establishing a communication interface within the process to allow the first border node and the second border node to communicate with each other.

In another embodiment, a device for establishing communication between a first blockchain network and a second blockchain network includes: one or more processors, and one or more computer-readable memories coupled to the one or more processors and having instructions stored thereon, wherein the instructions are executable by the one or more processors to: embed a first library into a process; execute the first library to create a first border node within the process, wherein the first border node operates in the first blockchain network; embed a second library into the process; execute the second library to create a second border node within the process, wherein the second border node operates in the second blockchain network; and establish a communication interface within the process to allow the first border node and the second border node to communicate with each other.

In still another embodiment, a non-transitory computer-readable medium have stored therein instructions that, when executed by a processor of a device, cause the device to perform a method for establishing communication between a first blockchain network and a second blockchain network. The method includes: embedding a first library into a process; executing the first library to create a first border node within the process, wherein the first border node operates in the first blockchain network; embedding a second library into the process; executing the second library to create a second border node within the process, wherein the second border node operates in the second blockchain network; and establishing a communication interface within the process to allow the first border node and the second border node to communicate with each other.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
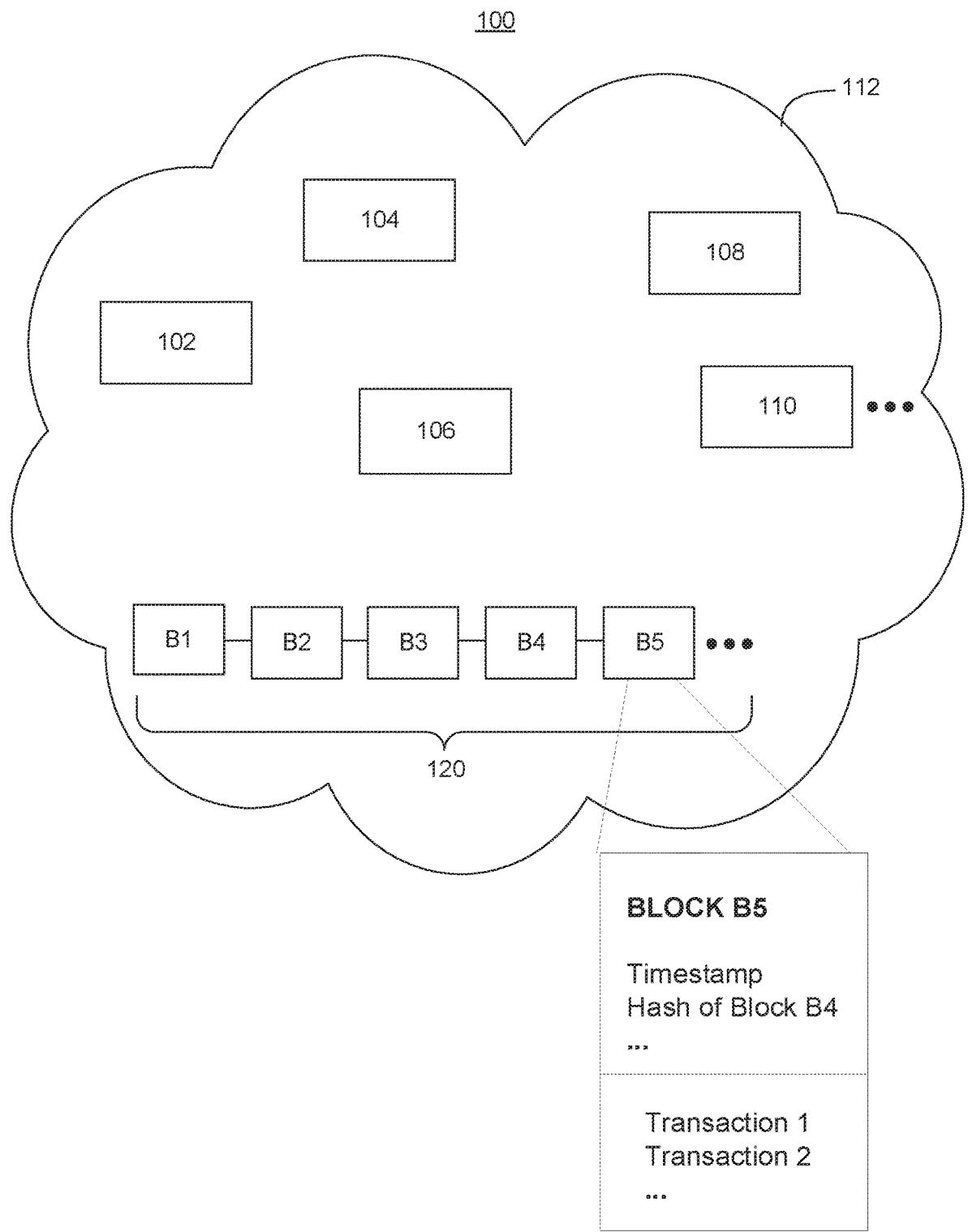
FIG. 1 is a schematic diagram of a blockchain system, according to an embodiment.

Embodiments of the specification provide methods and devices for establishing communication between blockchain networks. The methods and devices provide blockchain networks abilities to establish border nodes. Each established border node can be embedded into a process, e.g., a single Java process executing on a computing device. When two or more blockchain networks embed their respective border nodes into the same process, the respective border nodes are allowed to utilize function calls to communicate with each other and establish cross-chain communication between their respective blockchain networks.

Embodiments disclosed in the specification have one or more technical effects. In some embodiments, the methods and devices provide nodes in one blockchain network with the ability to communicate with nodes in a different blockchain network. This allows for multiple blockchain networks to establish cross-chain communications. In other embodiments, the methods and devices only need to utilize a single process (e.g., a single Java process) executing on a single computing device to establish communication between two blockchain networks. This allows for the blockchain networks to avoid having to establish sidechains, thereby reducing the hardware cost for implementing cross-chain communications. In still other embodiments, the methods and devices allow blockchain networks to embed their respective border nodes into the same single process and further allow the respective border nodes to utilize function calls to communicate with each other, thereby improving communication flexibility and providing abilities to support cross-chain communications between two or more blockchain networks. In still other embodiments, the methods and devices utilize hardware level processing unit instructions to allocate separate, private memory regions to the border nodes, thereby providing additional security and protection for the border nodes.

The following description provides details of embodiments. In the embodiments, a blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

Figure 2:
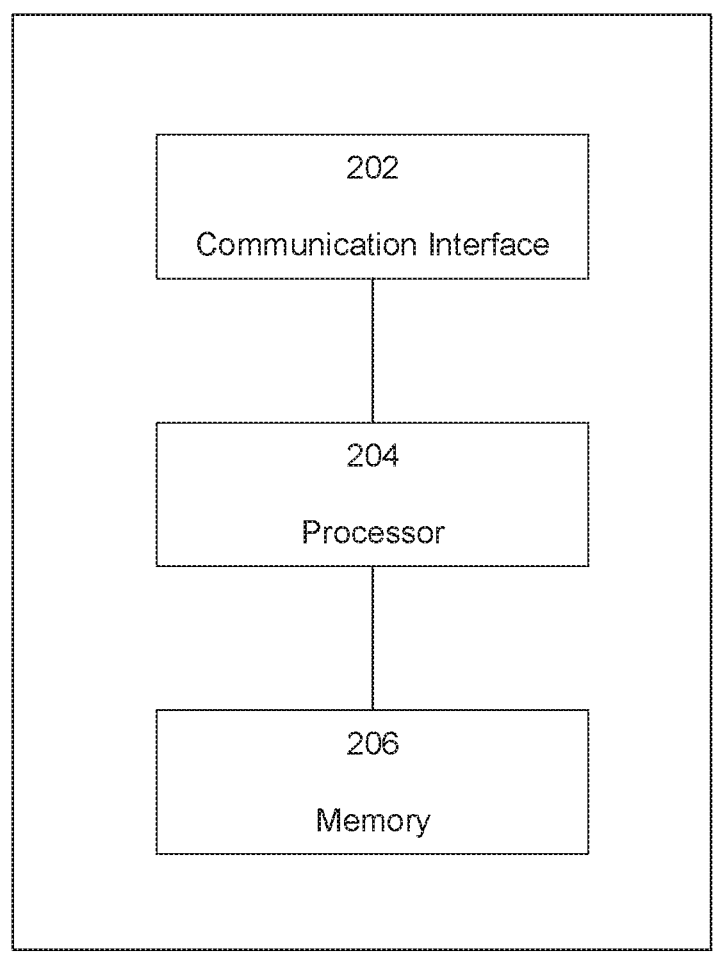
FIG. 2 is a schematic diagram of a computing device to implement a node in a blockchain network, according to an embodiment.

FIG. 2 illustrates a schematic diagram of a computing device 200 to implement a node, e.g., the node 102 (FIG. 1), in a blockchain system, according to an embodiment. Referring to FIG. 2, the computing device 200 may include a communication interface 202, a processor 204, and a memory 206.

The communication interface 202 may facilitate communications between the computing device 200 and devices implementing other nodes, e.g., nodes 104-110 (FIG. 1), in the network. In some embodiments, the communication interface 202 may support one or more communication standards, such as an Internet standard or protocol, an Integrated Services Digital Network (ISDN) standard, etc. In some embodiments, the communication interface 202 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In some embodiments, the communication interface 202 may be based on public cloud infrastructure, private cloud infrastructure, hybrid public/private cloud infrastructure.

The processor 204 may include one or more dedicated processing units, application-specific integrated circuits (ASICs), field-programmable gate arrays (FPGAs), or various other types of processors or processing units. The processor 204 is coupled with the memory 206 and may execute instructions stored in the memory 206.

The memory 206 may store processor-executable instructions and data, such as a copy of the blockchain 120 (FIG. 1). The memory 206 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 206 are executed by the processor 204, the computing device 200 may perform an operation on the blockchain 120.

Figure 3:
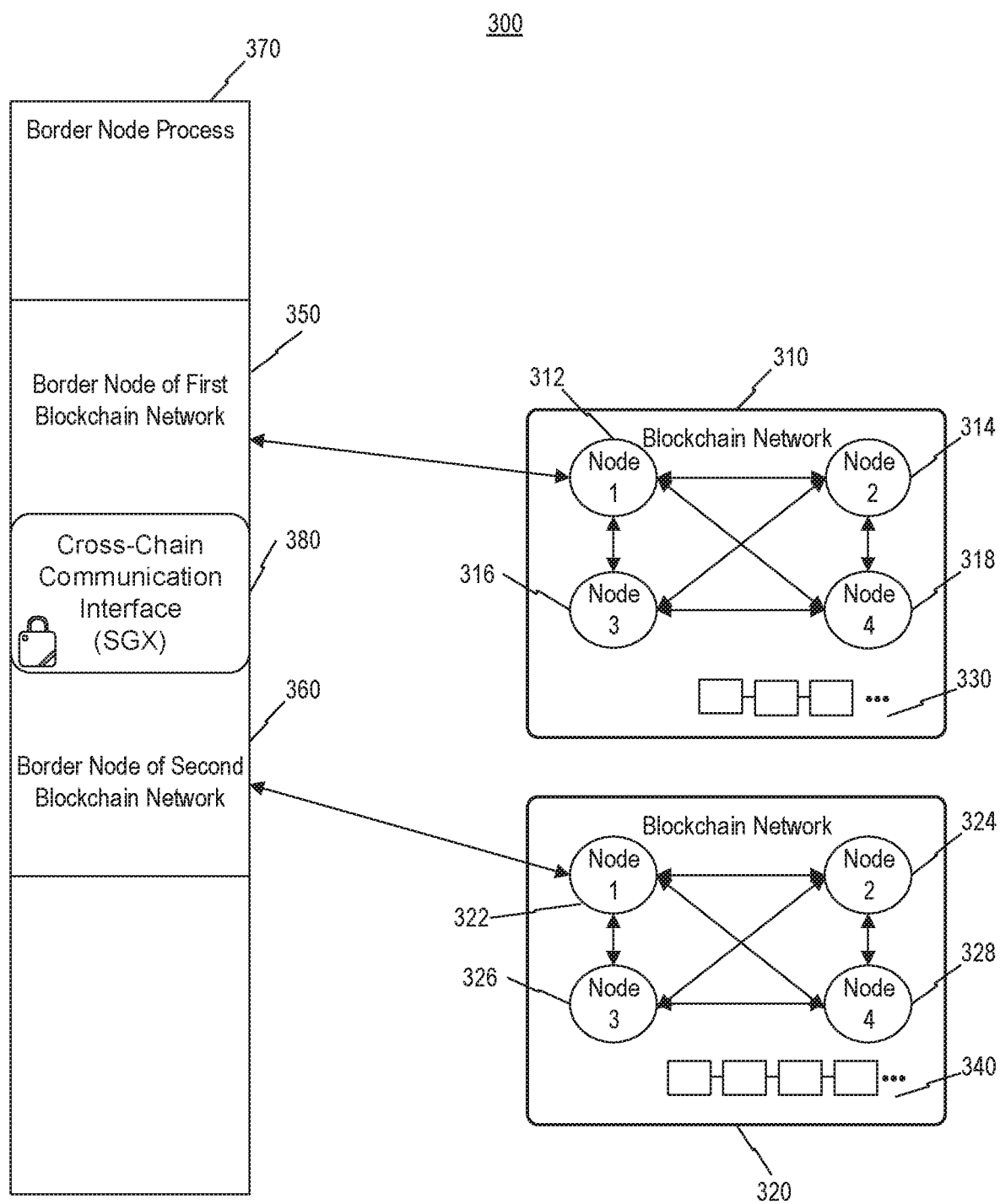
FIG. 3 is a schematic diagram of a blockchain system that supports cross-chain communication between first and second blockchain networks, according an embodiment.

FIG. 3 illustrates a schematic diagram of a blockchain system 300, according to an embodiment. Referring to FIG. 3, the system 300 may include a plurality of blockchain networks, such as a first blockchain network 310 and a second blockchain network 320. The first blockchain network 310 may include a plurality of nodes, e.g., nodes 312-318, to operate on one or more blockchains, such as a first blockchain 330. The second blockchain network 320 may include a plurality of nodes, e.g., nodes 322-328, to operate on one or more blockchains, such as a second blockchain 340 that is separate from the first blockchain 330.

The first blockchain network 310 may further include a border node 350. Similarly, the second blockchain network 320 may further include a border node 360. The border nodes 350 and 360 are different from their respective peer nodes 312-318 and 322-328 in that the border nodes 350 and 360 are embedded into a process, such as a single process 370. For example, the process 370 may be a single program such as a Java process or the like executing on a single computing device. In some embodiments, the process 370, which may be referred to as a border node process 370, can establish cross-chain communication between the first blockchain network 310 and the second blockchain network 320 through their respective border nodes 350 and 360.

In some embodiments, the border node 350 may be created only if all or a majority of the nodes 312-318 in the first blockchain network 310 agree to its creation. Likewise, in some embodiments, the border node 360 may be created only if all or a majority of the nodes 322-328 in the second blockchain network 320 agree to its creation.

In some embodiments, the process 370 may create the border node 350 by executing a first library provided, e.g., published, by the first blockchain network 310. The first library may include binary or executable code for the border node 350. In one embodiment, the first library may also include a copy of the first blockchain 330. Similarly, the process 370 may create the border node 360 by executing a second library provided, e.g., published, by the second blockchain network 320. The second library may include binary or executable code for the border node 360. In one embodiment, the second library may also include a copy of the second blockchain 340.

In some embodiments, the libraries may include a dynamic-link library (DLL). For example, a DLL may be a module of computer code that contains functions and data that can be used by another module, such as an application or another DLL. In some embodiments, the libraries may include a static library. For example, a static library may be a set of routines, external functions and variables which are resolved in a caller at compile-time and copied into a target application by a compiler, producing an object file and a stand-alone executable file. The static library may have a larger size compared to the DLL.

In some embodiments, the process 370 may establish a communication interface within the process to allow the border node 350 and the border node 360 to communicate with each other. For example, the process 370 may include a Java process that utilizes Java Native Interface (JNI) to support execution of libraries written in different languages, including C, C++, and assembly. In this manner, the process 370 may be able to execute the libraries even if the blockchain networks 310 and 320 provide the libraries in different languages. It is to be understood, however, that such an implementation is merely an example and is not meant to be limiting. It is contemplated that other frameworks such as Microsoft® .Net or the like may be utilized without departing from the spirit and scope of the specification.

In some embodiments, the process 370 may create the border nodes 350 and 360 in logically separated execution spaces. In one embodiment, the process 370 is executed on a computing device that includes a processor and a memory, and the process 370 causes the processor to allocate a separate, private memory region for the border nodes 350 and 360 using hardware level processing unit instructions 380, e.g., Intel® Software Guard Extensions (SGX). Accordingly, the process 370 may utilize the processing unit instructions 380 to establish and maintain logical separation between the border nodes 350 and 360. In one embodiment, the processor has the ability to provide encryption and privacy protection for the instructions executed by the processor. Accordingly, the process 370 may take the advantage of such abilities and provide encryption and privacy protection for the border nodes 350 and 360.

It is to be understood that the utilization of the hardware level processing unit instructions 380 implemented based on extensions such as the Intel® SGX is merely presented as an example and is not meant to be limiting. It is contemplated that the process 370 may utilize various types of hardware level processing unit instructions 380 capable of providing trusted execution environments (TEEs), including, but not limited to, the Intel® SGX and the like. In general terms, a TEE may be a secure area of a processing unit with code and data loaded inside. Once a TEE is created, the processor may provide hardware-enforced protection for the TEE, e.g., using cryptography, to ensure that contents stored in the TEE are protected, not to be read or written by processes outside of that TEE. The confidentiality and integrity of the TEE can therefore be established at the hardware level. In some embodiments, the process 370 may cause the processing unit to allocate a TEE to the communication interface within the process to allow the border node 350 and the border node 360 to communicate with each other.

In some embodiments, once created, the process 370 may continue to execute the libraries so that the border nodes 350 and 360 may operate in their respective blockchain networks together with their respective peer nodes. For example, the border node 350 may operate in the first blockchain network 310 together with the other nodes 312-318. The border node 350 may communicate with the other nodes 312-318 and manage the first blockchain 330 as if the border node 350 is a regular node operating in the first blockchain network 310. In one embodiment, when a new block is to be added to the first blockchain 330, the border node 350 may be notified and may determine whether to accept the new block. If the new block is accepted, the border node 350 may add the new block to its local copy of the first blockchain 330.

Similarly, the border node 360 may operate in the second blockchain network 320 together with the other nodes 322-328. For example, the border node 360 may communicate with the other nodes 322-328 and manage the second blockchain 340 as if the border node 360 is a regular node operating in the second blockchain network 320. In one embodiment, when a new block is to be added to the second blockchain 340, the border node 360 may be notified and may determine whether to accept the new block. If the new block is accepted, the border node 360 may add the new block to its local copy of the second blockchain 340.

In addition to operating in their respective blockchain networks, the border nodes 350 and 360 may also jointly establish cross-chain communication between their respective blockchains. In some embodiments, for example, the first blockchain network 310 may provide certain functions (or methods) to be called (or invoked) by nodes operating in other blockchain networks. These functions may be made available to the second blockchain network 320 through the border node 350. For example, if there is a need for the second blockchain network 320 to communicate with the first blockchain network 310, e.g., to conduct a cross-chain transaction, the second blockchain network 320 may utilize the border node 360 to make a call to an appropriate function provided by the border node 350. The border node 350 may process the call if the call is made appropriately, e.g., with proper permission and correct parameters. The border node 350 may reject the call if the call is inappropriate, e.g., with wrong parameters or the like. Furthermore, in some embodiments, the processor on which the border nodes 350 and 360 are executing may utilize processing unit instructions 380, e.g., Intel® SGX or other instructions that support TEE, to ensure that the calling node (the border node 360 in this example) is permitted to make the call to the node being called (the border node 350 in this example).

Similarly, the second blockchain network 320 may provide certain functions (or methods) that can be called (or invoked) by nodes operating in other blockchain networks and make such functions available through the border node 360. For example, if there is a need for the first blockchain network 310 to communicate with the second blockchain network 320, the first blockchain network 310 may utilize the border node 350 to make a call to an appropriate function provided by the border node 360. The border node 360 may process the call if it is made appropriately, or reject the call if it is inappropriate. In some embodiments, the processing unit instructions 380, e.g., Intel® SGX or other instructions that support TEE, may also be utilized to ensure that the calling node (the border node 350 in this example) is permitted to make the call to the node being called (the border node 360 in this example).

It is to be understood that the illustrations presented above are merely examples and are not meant to be limiting. For example, while the blockchain networks 310 and 320 depicted in FIG. 3 each include four nodes and a border node, such depictions are merely presented for illustrative purposes. It is to be understood that the blockchain networks 310 and 320 may include different numbers of nodes. Nodes may also be added or removed from the blockchain networks 310 and 320 without departing from the spirit and scope of the specification.

The border nodes 350 and 360 can also be removed from their respective blockchain networks 310 and 320. In some embodiments, the border node 350 can be removed only if all or a majority of the nodes in the first blockchain network 310 agree to its removal. Similarly, the border node 360 can be removed only if all or a majority of the nodes in the second blockchain network 320 agree to its removal.

In some embodiments, the first blockchain network 310 may remove the border node 350 using the same removal procedure it uses to remove the other nodes, such as the nodes 312-318. Similarly, the blockchain network 320 may remove the border node 360 using the same removal procedure it uses to remove the other nodes, such as the nodes 322-328. Removing either one of the border nodes 350 and 360 may have the effect of disabling the cross-chain communication established between the first blockchain network 310 and the second blockchain network 320.

In one embodiment, only a single process (e.g., a single Java process) executing on a single computing device is needed to establish communication between two blockchain networks. As a result, the hardware cost can be reduced. Additionally, because communications between blockchain networks can be carried out using function calls, communication efficiency can be improved compared to using sidechains. It is also noted that using hardware level processing unit instructions such as Intel® SGX or other instructions that support TEE and the like to allocate separate, private memory regions to the border nodes can provide additional security and protection for the border nodes.

Figure 4:
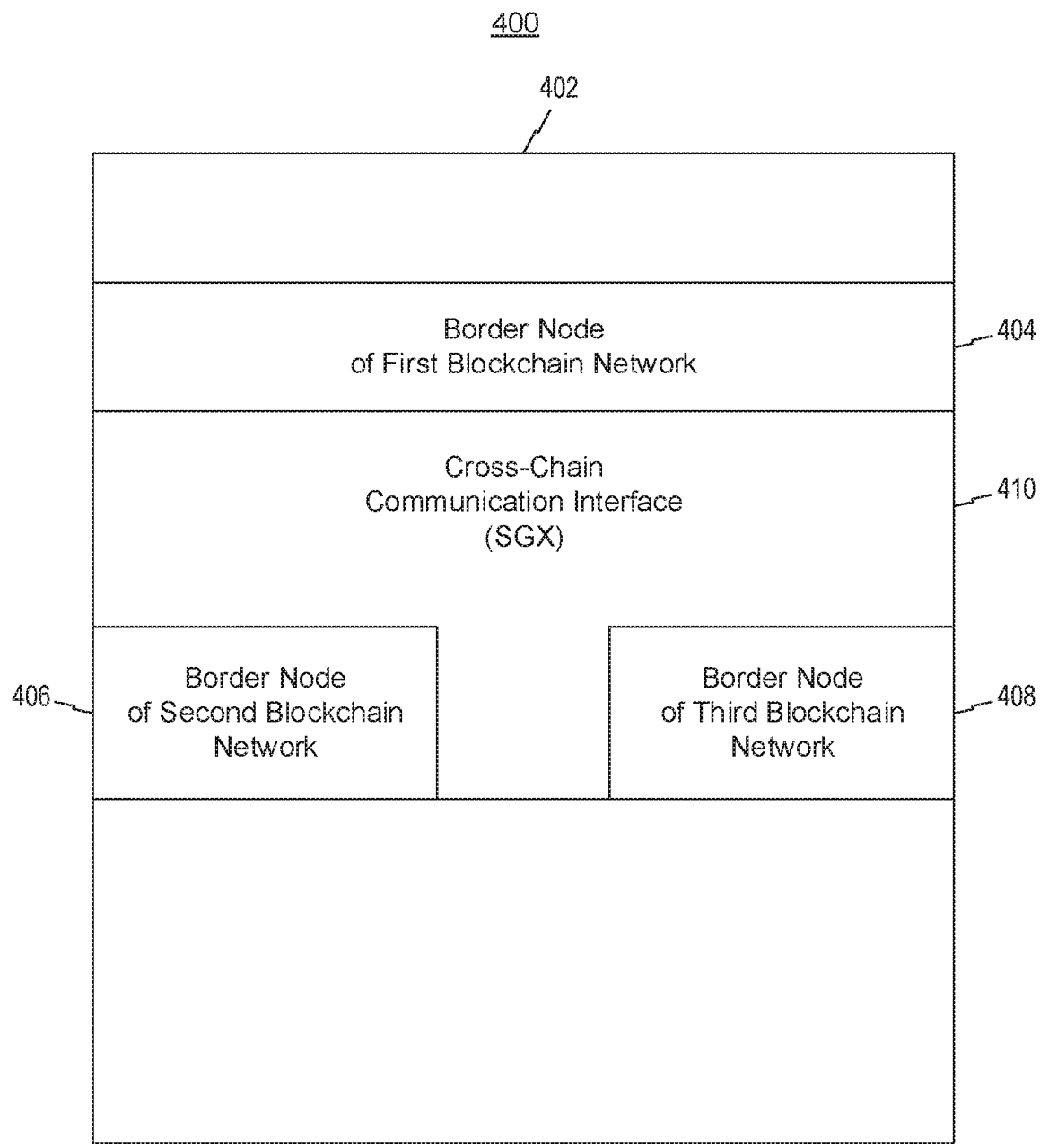
FIG. 4 is a schematic diagram of a blockchain system that supports cross-chain communication between first, second, and third blockchain networks, according an embodiment.

Furthermore, it is noted that the above described process may be utilized to facilitate communications between three or more blockchain networks. FIG. 4 illustrates a schematic diagram of a blockchain system 400 that utilizes a process 402 to facilitate communication between three blockchain networks, according to an embodiment. The process 402 may also support additional blockchain networks.

As illustrated in FIG. 4, in some embodiments, the process 402 may operate in manners similar to the process 370 (FIG. 3) to establish communications between a first blockchain network (not shown) and a second blockchain network (not shown). The process 402 may execute a first library provided by the first blockchain network to establish a border node 404. The process 402 may execute a second library provided by the second blockchain network to establish a border node 406. The process 402 may also execute a third library provided by a third blockchain network (not shown) to establish a border node 408. The process 402 may further utilize processing unit instructions 410, such as Intel® SGX or other instructions that support TEE and the like, to allocate separate, private memory regions to the border nodes 404-408. The border nodes 404-408 may then utilize function calls to communicate with each other and establish cross-chain communication between their respective blockchain networks.

In some embodiments, the process 402 may establish a communication interface within the process to allow the border nodes 404-408 to communicate with each other. For example, the process 402 may include a Java process that utilizes Java Native Interface (JNI) to support execution of libraries written in different languages, including C, C++, and assembly. In this manner, the process 402 may be able to execute the libraries even if the blockchain networks provide the libraries in different languages.

Figure 5:
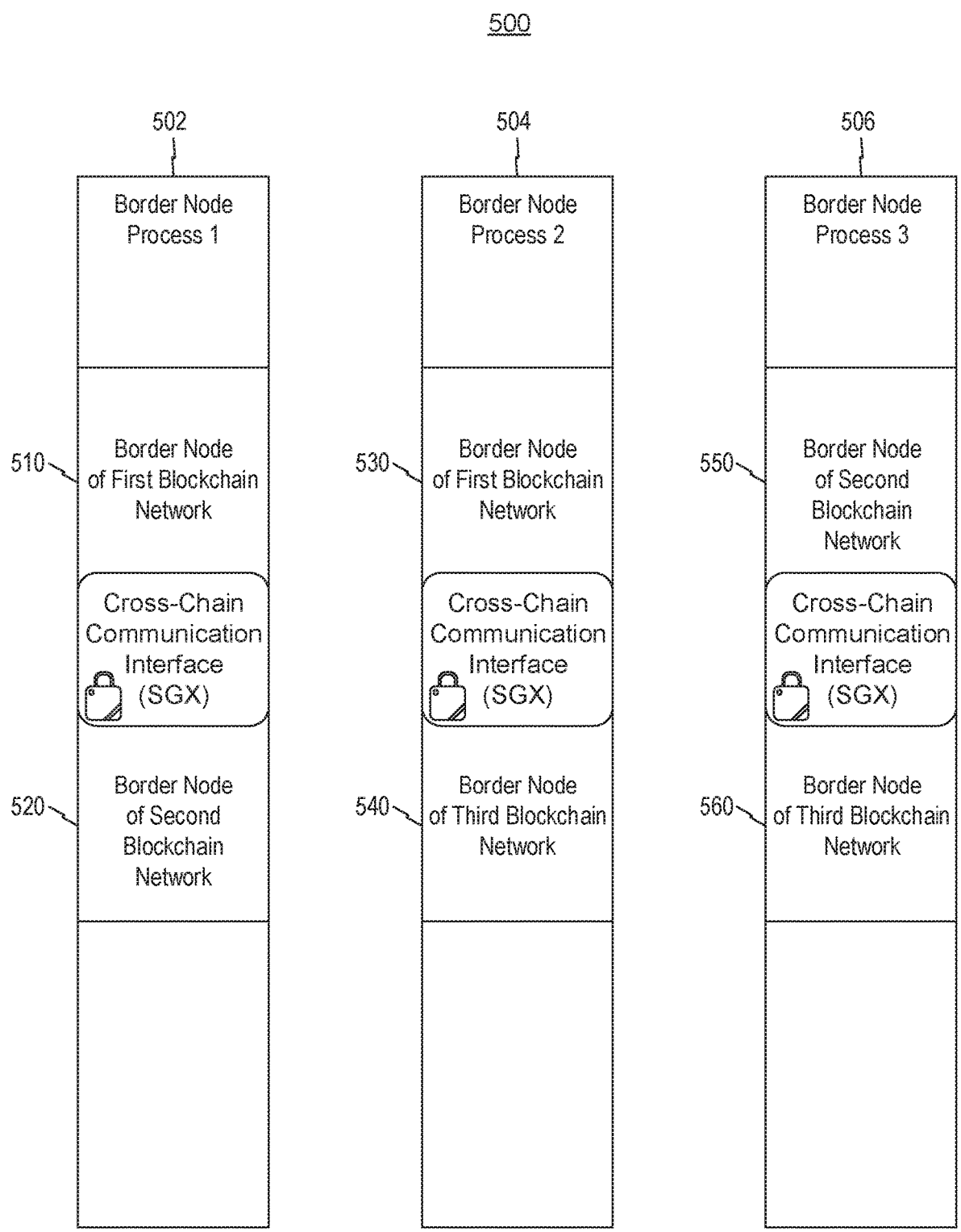
FIG. 5 is a schematic diagram of a blockchain system that supports cross-chain communication between first, second, and third blockchain networks, according an embodiment.

FIG. 5 illustrates a schematic diagram of a blockchain system 500 that utilizes three processes 502, 504, and 506 to provide an alternative solution to cross-chain communication between three blockchain networks.

Referring to FIG. 5, a process 502 operating in manners similar to the process 370 (FIG. 3) may be utilized to facilitate communications between a first blockchain network (not shown) and a second blockchain network (not shown). For example, the process 502 may execute a first library provided by the first blockchain network to establish a border node 510. The process 502 may also execute a second library provided by the second blockchain network to establish a border node 520. The border nodes 510 and 520 may then be utilized to facilitate communication between the first and second blockchain networks.

In some embodiments, a process 504 separate from the process 502 may be utilized to facilitate communications between the first blockchain network and a third blockchain network (not shown). For example, the process 504 may execute the first library provided by the first blockchain network to establish a border node 530. The process 504 may also execute a third library provided by the third blockchain network to establish a border node 540. The border nodes 530 and 540 may be utilized to facilitate communications between the first and third blockchain networks.

In some embodiments, a process 506 separate from the processes 502 and 504 may be utilized to facilitate communications between the second blockchain network and the third blockchain network. For example, the process 506 may execute the second library provided by the second blockchain network to establish a border node 550. The process 506 may also execute the third library provided by the third blockchain network to establish a border node 560. The border nodes 550 and 560 may be utilized to facilitate communications between the second and third blockchain networks.

In some embodiments, all three processes 502, 504, and 506 may execute on the same computing device. It is to be understood, however, that such a configuration is merely an example and is not meant to be limiting. In some embodiments, for example, the processes 502, 504, and 506 may execute on different computing devices. In some embodiments, additional processes configured in manners similar to the processes 502, 504, and 506 may also be utilized to establish communications with additional blockchain networks.

Figure 6:
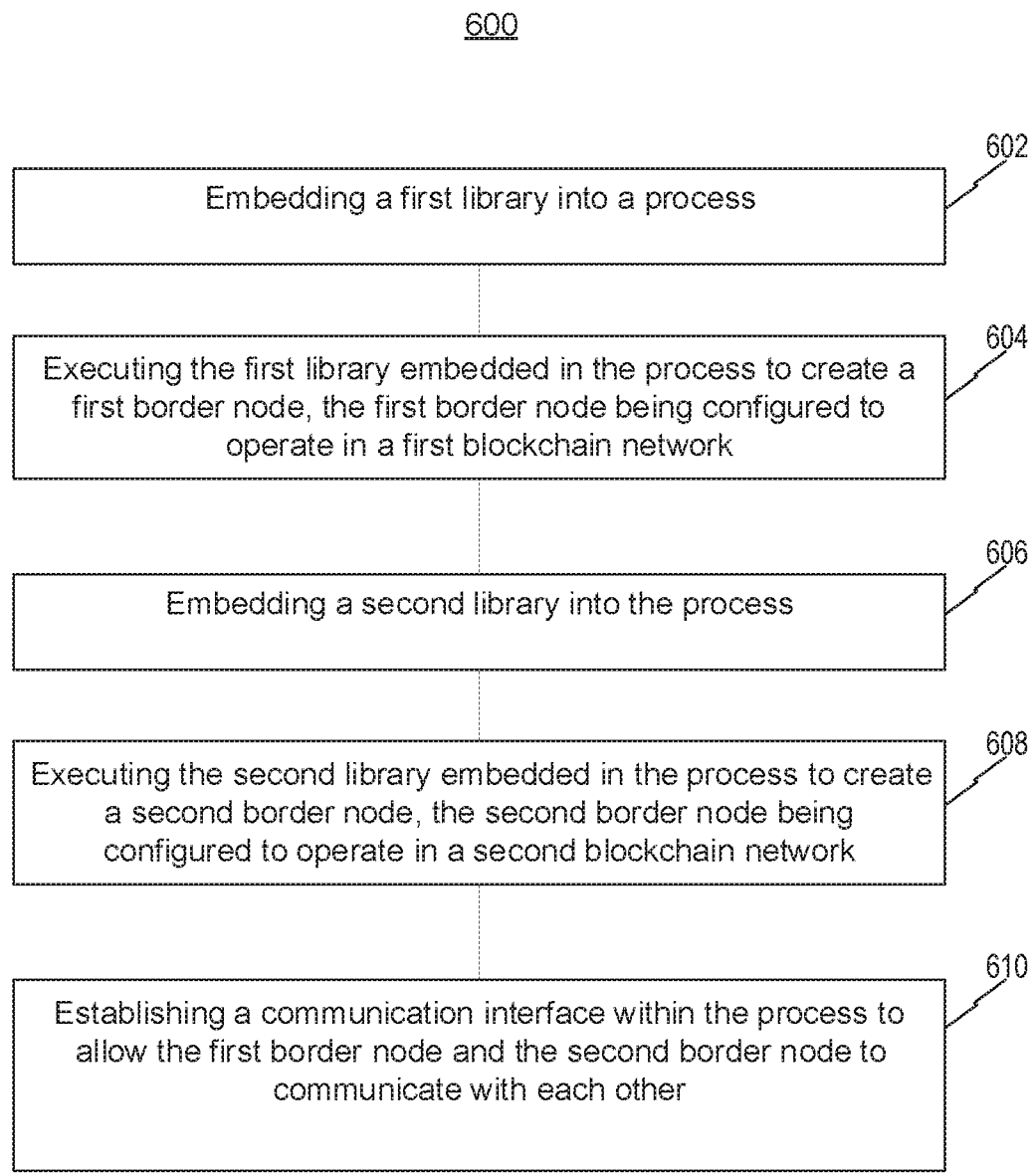
FIG. 6 is a flow chart of a method for establishing cross-chain communication between different blockchain networks, according to an embodiment.

FIG. 6 illustrates a flow chart of a method 600 for establishing cross-chain communication between a first blockchain network and a second blockchain network, according to an embodiment. For example, the first and second blockchain networks may each implement a P2P network including a plurality of nodes. Also, for example, the method 600 may be performed by the process 370 (FIG. 3) executing on a computing device similar to the computing device 200 described above.

Referring to FIGS. 3 and 6, at step 602, the process 370 may obtain a first library provided, e.g., published, by the first blockchain network, and embed the first library into its own execution. At step 604, the process 370 may execute the first library to create a first border node, e.g., the border node 350 depicted in FIG. 3. In some embodiments, the process 370 may be implemented as a Java process that utilizes JNI to embed and execute libraries written in different languages, including C, C++, and assembly. It is to be understood, however, that such an implementation is merely an example and is not meant to be limiting.

At step 606, the process 370 may obtain a second library provided, e.g., published, by the second blockchain network, and embed the second library into its own execution. At step 608, the process 370 may execute the second library to create a second border node, e.g., the border node 360 depicted in FIG. 3. Once created, the process 370 may continue to execute the binary code contained in the libraries provided for the border nodes 350 and 360 so that the border nodes 350 and 360 may operate in their respective blockchain networks 310 and 320 together with their respective peer nodes 312-318 and 322-328 as illustrated in FIG. 3.

At step 610, the process 370 may allow the first and second border nodes to communicate with each other and to establish a cross-chain communication interface for their respective blockchain networks. In some embodiments, the process 370 may establish the cross-chain communication interface by allowing the first and second border nodes to make authorized function calls to each other as described above. Furthermore, in some embodiments, the process 370 may execute on a processor that supports processing unit instructions, such as Intel® SGX or other instructions that support TEE and the like, which may be utilized to allocate separate, private memory spaces to the first and second border nodes to provide additional security.

The steps 602 and 604 may be repeated more than once to embed additional libraries and create additional border nodes, e.g., a third border node for a third blockchain network as depicted in FIG. 4. Additionally, the method 600 may be repeated more than once to create more than one instances of the process 370, e.g., three processes 502-506 may be created as depicted in FIG. 5, to provide cross-chain communications between three or more blockchain networks.

The method 600 may also be utilized to provide cross-chain communications for various types of blockchain networks. Each of the blockchain networks 310 and 320, for example, can be implemented as a public blockchain network, a private blockchain network, or a consortium blockchain network. It is contemplated that the methods in accordance with embodiments of the specification may be applicable to public blockchain networks, private blockchain networks, and consortium blockchain networks for various types of applications, e.g., record keeping, cryptocurrency, blockchain-based distributed ledgers or the like, without departing from the spirit and scope of the specification.

Figure 7:
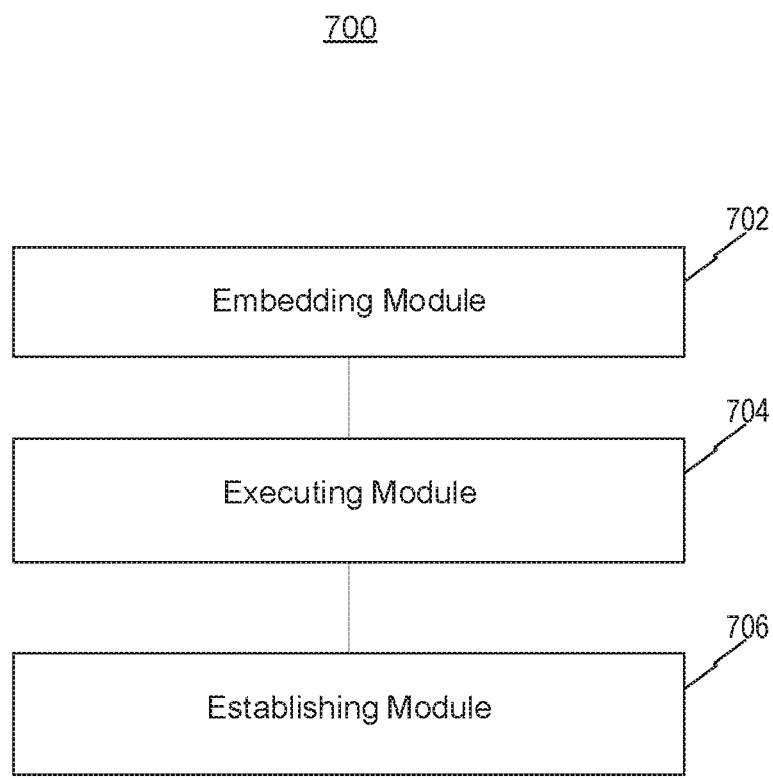
FIG. 7 is a block diagram of an apparatus for establishing cross-chain communication between different blockchain networks, according to an embodiment.

FIG. 7 illustrates a block diagram of an apparatus 700 for establishing communication between a first blockchain network and a second blockchain network, according to an embodiment. For example, the apparatus 700 may be an implementation of a software process, and may correspond to the method 600 (FIG. 6). Referring to FIG. 7, the apparatus 700 may include an embedding module 702, an executing module 704, and an executing module 706.

The embedding module 702 may embed a first library into a process. The executing module 704 may execute the first library to create a first border node within the process, and the first border node operates in the first blockchain network. The embedding module 702 may embed a second library into the process. The executing module 704 may execute the second library to create a second border node within the process, and the second border node operates in the second blockchain network. The establishing module 706 may establish a communication interface within the process to allow the first border node and the second border node to communicate with each other.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 700 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 700, references can be made to corresponding steps in the above-described methods. Details are omitted here for simplicity.

In some embodiments, a computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the claims.

What is claimed is:

1. A computer-implemented method for establishing communication between a first blockchain network and a second blockchain network, comprising:
    embedding a first library into a process;

executing the first library to create a first border node embedded into the process, wherein the first border node operates together with a first set of nodes in the first blockchain network, the first set of nodes not being embedded into the process;

embedding a second library into the process;

executing the second library to create a second border node embedded into the process, wherein the second border node operates together with a second set of nodes in the second blockchain network, the second set of nodes not being embedded into the process; and establishing a communication interface within the process to allow the first border node and the second border node to communicate with each other to jointly establish communication between the first blockchain network and the second blockchain network through the first border node and the second border node, wherein the process causes a processor to allocate a trusted execution environment to the communication interface, and the first border node and the second border node communicate with each other utilizing one or more function calls.

2. The method of claim 1, further comprising:

obtaining the first library and the second library, the first library including binary code for the first border node, and the second library including binary code for the second border node.

3. The method of claim 1, wherein the first library further includes data representing a first blockchain to be managed by the first border node.

4. The method of claim 1, wherein the second library further includes data representing a second blockchain to be managed by the second border node.

5. The method of claim 1, wherein the process is implemented as a single process executing on a computing device.

6. The method of claim 5, wherein the process utilizes an interface supporting execution of libraries written in different languages to embed and execute the first and second libraries.

7. The method of claim 1, wherein the process causes the processor to allocate a separate memory region to each of the first and second border nodes using hardware level processing unit instructions.

8. The method of claim 1, wherein the processor provides hardware-enforced protection for the trusted execution environment allocated to the communication interface utilizing cryptography.

9. The method of claim 1, further comprising:

embedding a third library into the process;

executing the third library to create a third border node within the process, wherein the third border node operates in a third blockchain network; and establishing the communication interface within the process to allow the first border node, the second border node, and the third border node to communicate with each other.

10. A device for establishing communication between a first blockchain network and a second blockchain network, comprising:

one or more processors; and one or more computer-readable memories coupled to the one or more processors and having instructions stored thereon that are executable by the one or more processors, wherein the one or more processors are configured to:

embed a first library into a process;

execute the first library to create a first border node embedded into the process, wherein the first border node operates together with a first set of nodes in the first blockchain network, the first set of nodes not being embedded into the process;

embed a second library into the process;

execute the second library to create a second border node embedded into the process, wherein the second border node operates together with a second set of nodes in the second blockchain network, the second set of nodes not being embedded into the process; and establish a communication interface within the process to allow the first border node and the second border node to communicate with each other to jointly establish communication between the first blockchain network and the second blockchain network through the first border node and the second border node, wherein the process causes the one or more processors to allocate a trusted execution environment to the communication interface, and the first border node and the second border node communicate with each other utilizing one or more function calls.

11. The device of claim 10, wherein the one or more processors are further configured to:

obtain the first library and the second library, the first library including binary code for the first border node, and the second library including binary code for the second border node.

12. The device of claim 10, wherein the first library further includes data representing a first blockchain to be managed by the first border node.

13. The device of claim 10, wherein the second library further includes data representing a second blockchain to be managed by the second border node.

14. The device of claim 10, wherein the process is implemented as a single process executing on a computing device.

15. The device of claim 14, wherein the process utilizes an interface supporting execution of libraries written in different languages to embed and execute the first and second libraries.

16. A non-transitory computer-readable medium having stored therein instructions that, when executed by a processor of a device, cause the device to perform a method for establishing communication between a first blockchain network and a second blockchain network, the method comprising:

embedding a first library into a process;

executing the first library to create a first border node embedded into the process, wherein the first border node operates together with a first set of nodes in the first blockchain network, the first set of nodes not being embedded into the process;

embedding a second library into the process;

executing the second library to create a second border node embedded into the process, wherein the second border node operates together with a second set of nodes in the second blockchain network, the second set of nodes not being embedded into the process; and establishing a communication interface within the process to allow the first border node and the second border node to communicate with each other to jointly establish communication between the first blockchain network and the second blockchain network through the first border node and the second border node, wherein the process causes the processor to allocate a trusted execution environment to the communication interface, and the first border node and the second border node communicate with each other utilizing one or more function calls.

\* \* \* \* \*